(12) United States Patent
Fujii (10) Patent No.: US 7,771,307 B2
(45) Date of Patent: Aug. 10, 2010

(54) ROLLING ELEMENT SCREW DEVICE

(75) Inventor: Hideki Fujii, Shinagawa-ku (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 12/440,850

(22) PCT Filed: Sep. 5, 2007

(86) PCT No.: PCT/JP2007/067274

§ 371 (c)(1),
(2), (4) Date: Mar. 11, 2009

(87) PCT Pub. No.: WO2008/050543

PCT Pub. Date: May 2, 2008

(65) Prior Publication Data

US 2009/0282940 A1    Nov. 19, 2009

(30) Foreign Application Priority Data

Sep. 29, 2006  (JP) ............................. 2006-266291

(51) Int. Cl.
*F16H 25/22*   (2006.01)
(52) U.S. Cl. .................... 475/343; 74/424.89; 74/89.42
(58) Field of Classification Search ................ 74/89.42, 74/89.34, 424.81, 424.89, 424.9; 475/331, 475/343
See application file for complete search history.

(56) References Cited

U.S. PATENT DOCUMENTS 5,178,030 A    1/1993    Bousquet

FOREIGN PATENT DOCUMENTS

| JP | 4-231705 A | 8/1992 |
|---|---|---|
| JP | 2002-257165 A | 9/2002 |
| JP | 2002-323108 A | 11/2002 |

*Primary Examiner*—Roger L Pang
*Assistant Examiner*—Derek D Knight
(74) *Attorney, Agent, or Firm*—Sughrue Mion, PLLC (57) ABSTRACT

A rolling element screw device is provided with a power transmission mechanism for moving a retainer ring 14 in an axial direction in accordance with lead angles of spiral grooves 11a, 12a while rotating the retainer ring 14 in a condition of maintaining a constant relationship with respect to a rotational phase of a rotating side member in accordance with the rotation of the rotating side member. The power transmission mechanism is provided with an external tooth 17 formed to a screw member 11, an internal tooth 18 formed to a nut member 12 and a plurality of planetary gears 19 held to be rotatable to circumferentially predetermined positions of the retainer ring 14 in a condition meshed with the external tooth 17 and the internal tooth 18, respectively, the external tooth 17 is formed so as not to overlap with the screw side spiral groove 11a formed to the screw member 11, and the internal tooth 18 is formed so as not to overlap with the nut side spiral groove 12a formed to the nut member 12. According to such structure, there can be provided a rolling element screw device capable of maintaining always constant the moving amount in both the axial directions of the retainer ring.

4 Claims, 5 Drawing Sheets

ROLLING ELEMENT SCREW DEVICE

TECHNICAL FIELD

The present invention relates to a rolling element screw device, and more particularly, to an improvement of a rolling element screw device of a type using a retainer ring and provided with a shift preventing mechanism for preventing the shift of the retainer ring.

BACKGROUND ART

Conventionally, there are known rolling element screw devices in each of which a plurality of rolling elements are disposed between a screw side spiral groove formed in an outer peripheral surface of a screw member and a nut side spiral groove formed in an inner peripheral surface of a nut member so as to convert a thrust force of the screw member to a torque of the nut member or vice versa. These rolling element screw devices include one type provided with a retainer ring for retaining rolling elements between the screw member and the nut member so as to realize stable torque-thrust conversion by aligning the rolling elements by means of the retainer ring.

Operation of the rolling element screw device of the type using the retainer ring such as mentioned above will be explained hereunder. For example, when the nut member of the rolling element screw device is rotated, the rolling elements disposed between the nut member and the screw member roll and, simultaneously, the retainer ring having a retainer pockets in each of which the rolling element is accommodated is pushed by the rolling elements, so that the retainer ring is moved in an axial direction thereof while being rotated as like as the nut member in accordance with revolving speed of the rolling element.

During such operation, when the rolling element regularly rolls and any irregular sliding motion is not caused, the retainer ring is moved in the axial direction in accordance with revolution number and spiral groove lead while rotating at the same speed as theoretical revolution speed of the rolling element. However, the retainer ring has a nature of delay by a predetermined amount with respect to the rotational phase of the nut member. This is a known matter based on the rotation operation theory of the retainer ring in a general rolling bearing.

Of course, in an actual operation, there is a case where the rolling element does not regularly roll and irregular sliding motion is caused, and accordingly, the rotational phase of the retainer ring may advance or delay with respect to the ideal motion as mentioned above in response to the irregular sliding motion. Particularly, such advance amount or delay amount is different in the moving direction or moving amount in the axial direction of the nut member.

Because of this reason, when the nut member is rotated repeatedly reversely in directions, the advancing amount or delaying amount in the rotational phase of the retainer ring is accumulated and the retainer ring is sifted in either one side in the axial direction thereof. In the case when such one-side shifting is caused and progresses, the rolling element pocket of the retainer ring may protrude in one direction from a one shaft end side of the nut member, and as a result, there may cause a case that the rolling element drops off from the rolling element pocket of the retainer ring.

Then, in the conventional technology, for example, in the screw member, one stopper member such as pin or stopper ring for limiting movable range in the axial direction of the retainer ring is mounted to each of both end portions of a movable stroke range of the nut member.

However, in a structure in which the axial movable range of the retainer ring is limited by the stopper member, when the retainer ring abuts against the stopper member, the retainer ring is stopped from moving and the rolling element slides while rotating but not revolving, so that driving torque of the nut member extremely increases at this sliding time and the nut member is not smoothly moved, thus providing a problem.

Figure 6:
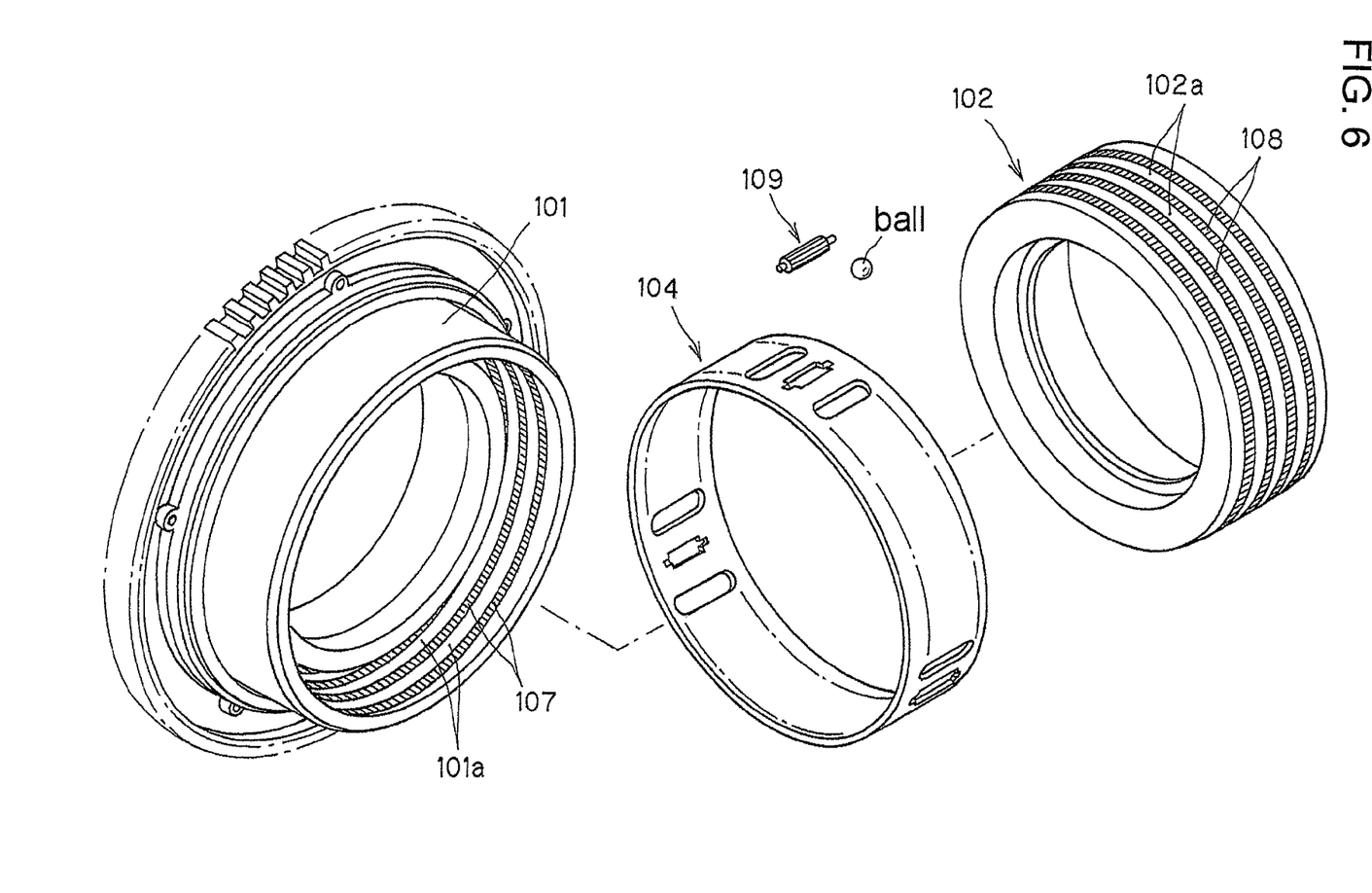
[FIG. 6] is a developed perspective view showing a structure of a conventional ball screw device disclosed in a cited Patent Document 1.

Then, in order to solve such problem, a technology disclosed in the following Patent Document 1 has been proposed. That is, in the following Patent Document 1, there is proposed the technology in which, in a rolling element screw device of the type using a retainer ring, the one side shifting in the axial direction of the retainer ring is eliminated and the problem provided in the conventional technology is solved. More specifically, the technology disclosed in the following Patent Document 1 is characterized by a ball screw device using a retainer ring 104, as shown in FIG. 6, which is provided with a power transmission mechanism composed of an interior tooth 107 formed to a land portion adjacent to a spiral groove 101a of a nut member 101, an external tooth 108 formed, at an equal interval in the spiral direction, to a land portion adjacent to a spiral groove 102a of a nut member 102, and a planetary gear 109 held to be rotatably to a predetermined position in the circumferential direction of the retainer ring 104 in a state meshed respectively with the interior tooth 107 and the exterior tooth 108.

In the Patent Document 1, the power transmission mechanism of the structure mentioned above is provided for the ball screw device, and accordingly, the planetary gear 109 is meshed with the internal tooth 107 or external tooth 108 and moved in this state, so that the retainer ring 104 maintains a constant relationship with respect to rotational phase of the rotating side member (i.e., nut member 101 or screw member 102) to thereby always keep constant the moving amount in both the axial directions of the retainer ring 104. That is, according to the technology disclosed in the Patent Document 1, as means for limiting the axial movement of the retainer ring 104, a stopper member of the conventional structure is used to avoid such a phenomenon as that driving torque increases when the retainer ring abuts against the stopper member and to realize smooth operation of the device to thereby contribute to the improvement of the reliability.

Patent Document 1: Japanese Patent Application Laid-open Publication No. 2002-323108

DISCLOSURE OF THE INVENTION

Problems to be Solved by the Invention

However, the technology disclosed in the above Patent Document 1 involves various constraints on design, and accordingly, it is not simply applicable to all the types of the rolling element screw devices. More specifically, according to the technology disclosed in the Patent Document 1, the internal tooth 107 and the external tooth 108 meshed with the planetary gear 109 are formed to the adjacent land portion. Such a formation of the teeth to the land portion gives adverse influence to the spiral grooves 101a, 102a which are repeatedly subjected to rolling load and sliding load from the balls, which hence leads to the reduction of the rigidity of the rolling element screw device itself. This fact means that the provision of the power transmission mechanism while maintaining the rigidity increases the constrains on the design, and also means that the applicable range of the technology disclosed in the Patent Document 1 becomes very narrow.

In addition, in the technology disclosed in the Patent Document 1, there is a restriction on the design such that the number of the balls to be disposed must be reduced for disposing the planetary gear 109 to provide an interval between the balls in the rotating direction. This structure also leads to the lowering of the rigidity of the rolling element screw device itself.

Furthermore, the formation of the spiral groove 101a on the inner peripheral surface of the nut member 101 and the formation of the internal tooth 107 to the land portion contacting to the spiral groove 101a involve difficulty in working technique. Accordingly, the rolling element screw device adopting the technology disclosed in the Patent Document 1 increases manufacturing cost, thus providing a problem.

The present invention was made in consideration of the problems mentioned above and an object thereof is to provide a technology capable of avoiding a phenomenon of increasing the driving torque at a time when a retainer ring of the conventional structure abuts against a stopper member, providing less constrain on the design when applied and realizing, easily with less cost without damaging reliability of the device, the structure in which the moving amount of a retainer ring in both the axial direction can be kept always constant.

Means for Solving the Problems

A rolling element screw device according to the present invention comprises: a screw member formed, in an outer peripheral surface thereof, with a screw side spiral groove; a nut member formed, in an inner peripheral surface thereof, with a nut side spiral groove; a plurality of rolling elements disposed to be rollable between the screw side spiral groove and the nut side spiral groove; a retainer ring disposed in an annular space between the screw member and the nut member opposing to each other and adapted to retain a plurality of rolling elements at predetermined positions to be rollable; and a power transmission mechanism for moving, in a condition that either one of the screw member and the nut member is constructed as a rotating side member, the retainer ring in an axial direction in accordance with the lead angles of the screw side spiral groove and the nut side spiral groove while rotating the retainer ring while maintaining a constant relation with respect to a rotational phase of the rotating side member according to rotation of the rotating side member, the power transmission mechanism comprising: an external tooth formed to the screw member; an internal tooth formed to the nut member; and a plurality of planetary gears held, to be rotatable, at circumferentially predetermined positions of the retainer ring in a condition to be meshed with the external tooth and the internal tooth, respectively, wherein the external tooth is formed to an area separated in a axial direction of the screw side spiral groove so as not to overlap with the screw side spiral groove formed to the screw member, and the internal tooth is formed to an area separated in a axial direction of the nut side spiral groove so as not to overlap with the nut side spiral groove formed to the nut member.

In the rolling element screw device of the present invention, the screw member may be provided with a screw member body to which the screw side spiral groove is formed and an external tooth forming portion to which the external tooth is formed, and the nut member is provided with a nut member body to which the nut side spiral groove is formed and an internal tooth forming portion to which the internal tooth is formed.

Further, in the rolling element screw device according to the present invention, it may be desired that gear angles of the external tooth, the internal tooth and the planetary gear are formed so as to correspond to the lead angles of the screw side spiral groove and the nut side spiral groove, respectively.

Furthermore, in rolling element screw device according to the present invention, it may be desired that the planetary gear has a central axis which is positioned on a pitch circle of a plurality of rolling elements.

Further, it is to be noted that the present invention of the structure mentioned above is not provided with all the essential subject features of the present invention, and sub-combination of these subject features may constitute the present invention.

Effects of the Invention

According to the present invention, there is provided a rolling element screw device capable of avoiding such a phenomenon as that a driving torque is increased at a time of abutment of a retainer ring of a conventional structure against a stopper member, and there is less restriction on design at the time of application, and moving amount in both the axial direction of the retainer ring can be maintained always constant. In addition, according to the present invention, it becomes possible to manufacture a rolling element screw device easily at a low cost without damaging reliability of the device.

BEST MODE FOR CARRYING OUT THE INVENTION

Hereunder, a preferred embodiment for embodying the invention will be explained with reference to the accompanying drawings. Further, the following embodiment does not limit the inventions of the respective claims, and all the combination of the characteristics explained in the embodiment is not essential for the solution of the problems of the invention.

Figure 1:
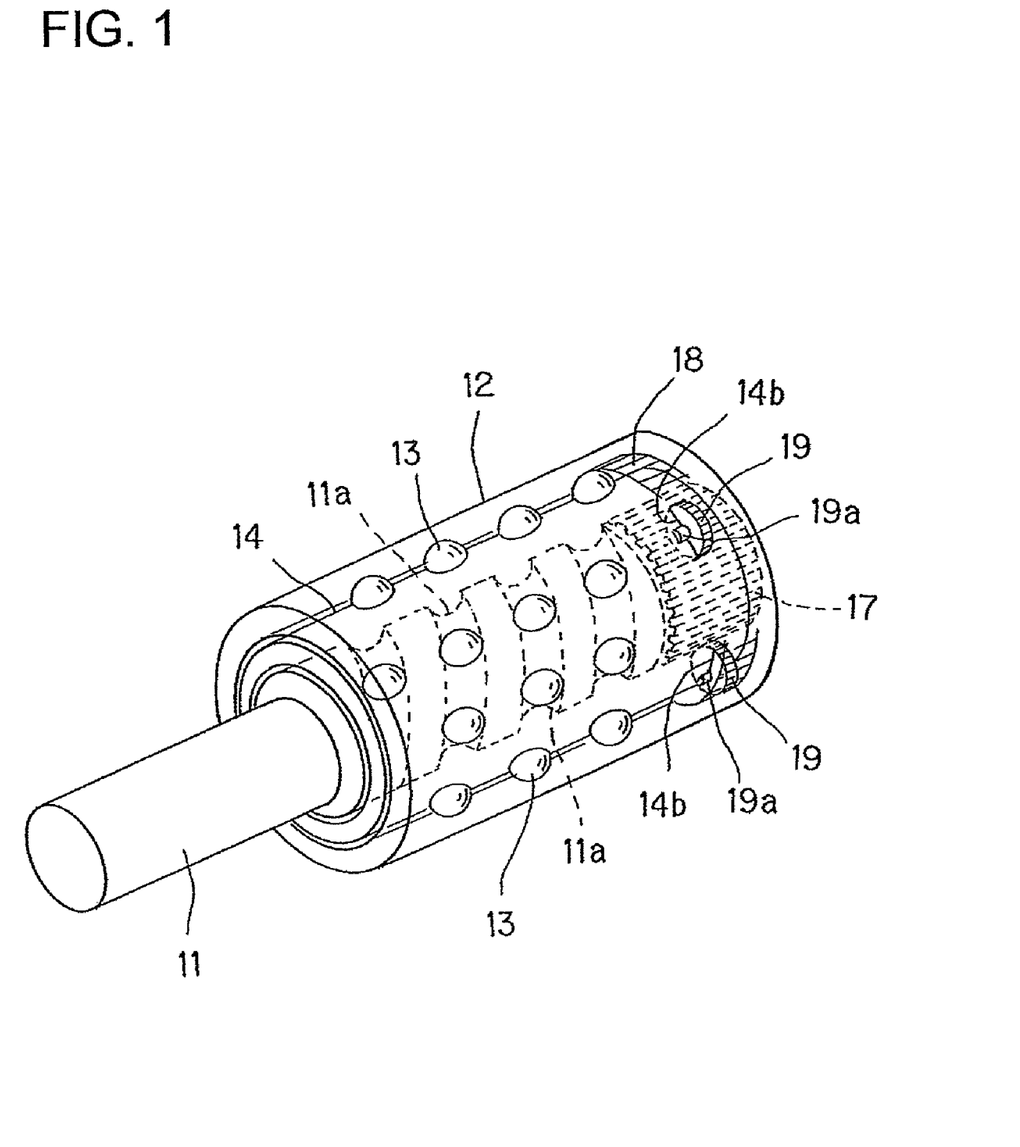
[FIG. 1] is a perspective view for explaining the entire structure of a rolling element screw device according to an embodiment of the present invention.
Figure 2:
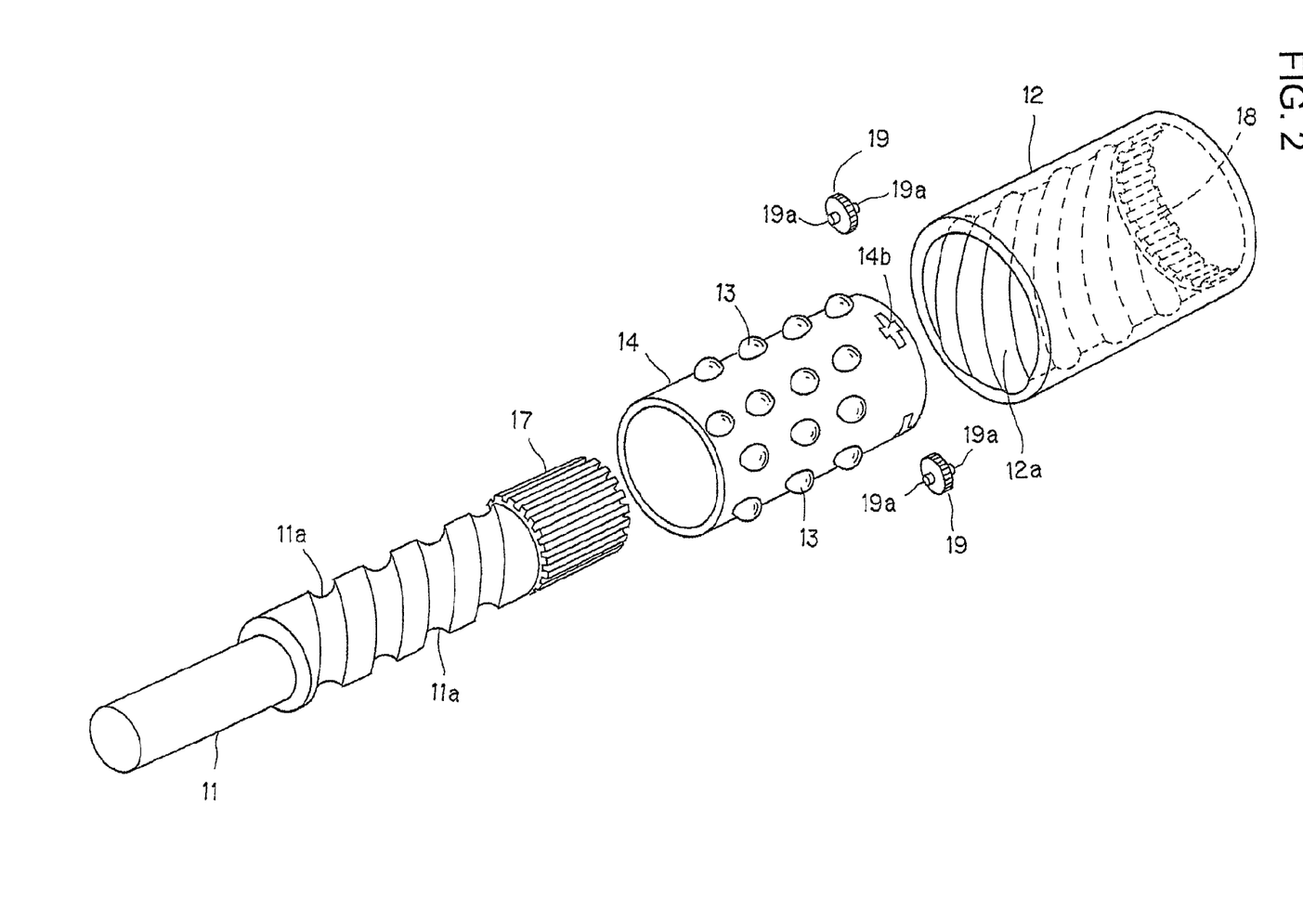
[FIG. 2] is a developed perspective for explaining the structure of the rolling element screw device according to the embodiment.

FIG. 1 is a perspective view for explaining the entire structure of a rolling element screw device according to an embodiment of the present invention, and FIG. 2 is a developed perspective for explaining the structure of the rolling element screw device according to the embodiment.

The rolling element screw device according to the embodiment of the present invention shown in FIGS. 1 and 2 includes: a screw member 11 formed, in the outer peripheral surface thereof, with a screw side spiral groove 11a; a nut member 12 formed, in the inner peripheral surface thereof, with a nut side spiral groove 12a; a plurality of balls 13 as rolling elements disposed to be rollable between the screw side spiral groove 11a and the nut side spiral screw groove 12a; and a retainer ring 14 disposed in an annular space between the opposing screw member 11 and the nut member 12 so as to hold a plurality of balls 13 to be rollable at predetermined positions. This rolling element screw device is formed as a rolling element screw device of a limited stroke structure, so-called "non-circulation type", in which a plurality of balls 13 are held by the retainer ring 14 to be rollable but not circulated.

The screw member 11 has one end portion (left lower side on FIGS. 1 and 2 of the drawing) which is formed as "shaft end" to which a motor as a driving source is connected or a member to be operated is mounted. A ball receiving portion is formed to a central portion continuous to this shaft portion, the ball receiving portion being formed with the screw side spiral groove 11a. The other end portion of the screw member 11 continuous to the central portion is formed with the external tooth 17.

The nut member 12 has one end portion (left lower side on FIGS. 1 and 2 of the drawings) which is provided with the nut side spiral groove 12a and the other side end portion continuous to the one end portion is formed with the internal tooth 18. A member to be operated is mounted to the nut member 12, or a motor as a driving source for rotating the nut member 12 is connected to the nut member 12.

The external tooth 17 is formed in a separated area in the axial direction of the screw side spiral groove 11a so as not to overlap with the screw side spiral groove 11a formed to the screw member 11. The internal tooth 18 is also formed in a separated area in the axial direction of the nut side spiral groove 12a so as not to overlap with the nut side spiral groove 12a formed to the nut member 12. Further, the screw side spiral groove 11a formed in the outer peripheral surface of the screw member 11 and the nut side spiral groove 12a formed in the inner peripheral surface of the nut member 12 are formed so as to have the same lead angle. On the other hand, the external tooth 17 formed in the outer peripheral surface of the screw member 11 and the internal tooth 18 formed in the inner peripheral surface of the nut member 12 are both formed so as to have tooth numbers in conformity with difference in movement of the retainer ring 14 and the nut member 12.

The retainer ring 14 is formed from a resin material so as to provide a cylindrical shape, and serves to hold the balls 13 at a plurality of portions on the cylindrical surface to be rollable. The detailed structure of the retainer ring 14 will be described with reference to FIG. 3, which is a perspective view showing the retainer ring according to the embodiment of the present invention.

Figure 3:
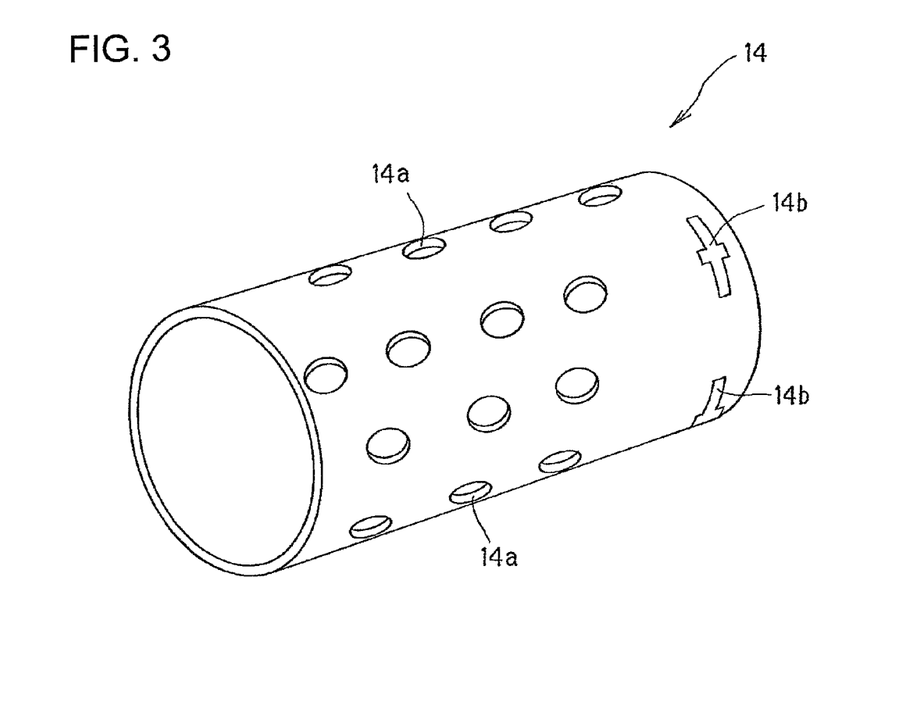
[FIG. 3] is a perspective view for explaining the structure of a retainer ring according to the embodiment of the present invention.

As shown in detail in FIG. 3, a plurality of ball pockets 14a, in each of which one ball 13 can be held, are formed to a plurality of portions in the cylindrical surface of the retainer ring 14. Each of the ball pocket 14a has a diameter slightly larger than the outer diameter of the ball so as to realize smooth rolling motion of the ball 13 in the ball pocket 14a.

Furthermore, the retainer ring 14 is provided with a plurality of gear pockets 14b at one end portion (right upper side on FIG. 3 of the drawing). Each of the gear pocket 14b is formed so as to penetrate in the diameter direction of the retainer ring 14 so as to accommodate the planetary gears 19 meshed to be rotatable between the external tooth 17 and the internal tooth 18.

Each of the planetary gears 19 has both ends at which small diameter shank portions 19a, 19a (refer to FIG. 2) and is rotated around these shank portions 19a, 19a.

The planetary gear 19 has a central axis arranged to be parallel with the center lines of the screw member 11 and the nut member 12 so as to position on or near the pitch circle of the ball 13. According to such structure, since the planetary gears 19 and the retainer ring 14 are moved spirally at substantially the same speed as that of the ball 13, the ball 13 hardly interfere with the ball pocket 14a of the retainer ring 14.

Furthermore, the gear pocket 14b has a shape approximately conforming with a shape in a plan view of the planetary gear 19. An axial width of a wide width portion at an intermediate position in the circumferential direction of the gear pocket 19b is formed to be slightly larger than a longitudinal length of the small diameter shank portion 19a of the planetary gear 19, and on the other, an axial width of a narrow width portion of both ends in the circumferential direction of the gear pocket 14b is formed to be sufficiently larger than the thickness dimension of the planetary gear 19.

According to the structure mentioned above, the retainer ring 14 is slightly shifted in the axial direction with respect to the planetary gear 19. However, the planetary gear 19 does not contact to the inner wall of the narrow width portion of the gear pocket 19b, and by setting the diameter of the planetary gear 19 to be larger than the thickness of the retainer ring 14, the planetary gear 19 protrudes inward and outward in the diameter direction of the gear pocket 14b.

As mentioned above, the rolling element screw device according to the embodiment of the present invention is provided with: the external tooth 17 formed to the screw member 11; the internal tooth formed to the nut member 12; and a plurality of planetary gears 19 (three in this embodiment) held to be rotatable at the predetermined positions in the circumferential direction of the retainer ring 14 in the state of being meshed with the external tooth 17 and the internal tooth 18, respectively. These external tooth 17, internal tooth 18 and planetary gears 19 constitute the power transmission mechanism. According to the function of this power transmission mechanism, in the rolling element screw device according to the present embodiment, the displacement (moving amount) of the retainer ring 14 in the axial direction can be always maintained constant. That is, in this embodiment, by locating the power transmission mechanism composed of the external tooth 17, the internal tooth 18 and the planetary gears 19, when one of the screw member 11 and the nut member 12 is constituted as rotating side member, the retainer ring 14 can be moved in the axial direction in accordance with the lead angles of the screw side spiral groove 11a and the nut side spiral groove 12a while rotating the retainer ring 14 at a constant relationship with respect to the rotational phase of the rotating side member in accordance with the rotation of the rotating side member.

Next, the operation of the rolling element screw device according to the present embodiment of the structure mentioned above will be explained hereunder. Further, in the following explanation, there is descried an example in a case where the motor is connected to the one end side shank portion of the screw member 11, and the nut member 12 is connected to an object to be operated in a condition that the operation in the rotating direction of the nut member 12 is restricted.

First, when the motor, not shown, is driven to rotate the screw member 11, the rotating motion of the screw member 11 is transmitted to the nut member 12 through a plurality of balls 13, and the nut member 12 is moved linearly toward the axial one side of the screw member 11. On the while, when the motor is rotated in the reverse direction, the screw member 11 is rotated in the direction reverse to that of the above-mentioned direction, and accordingly, the nut member 12 is moved linearly in the direction reverse to that mentioned above. Thus, by driving the motor in one and reverse directions, the nut member 12 can be moved reciprocally in the axial direction.

Furthermore, when the nut member 12 is moved in the axial direction while rotating the screw member 11, the planetary gears 19, which are meshed with the external tooth 17 formed to the screw member 11 which is rotatable but movable in the axial direction and also meshed with the internal tooth 18 formed to the nut member which is movable in the axial direction but not rotatable, are relatively revolved on the outer peripheral side of the screw member 11 and the inner peripheral side of the nut member 12. At this time, the retainer ring 14 moves in the axial direction while being rotated by the movement of the balls 13, so that the planetary gears 19 are also moved in the axial direction of the screw member 11.

That is, when the retainer ring 14 and the planetary gears 19 of the arrangement mentioned above are operated, the retainer ring 14 is moved in the axial direction in accordance with the lead angles of the screw side spiral groove 11a and the nut side spiral groove 12a while rotating around the screw member with delay of constant phase angle with respect to the rotational phase of the screw member 11.

As mentioned above, in the present embodiment, since the planetary gears 19 are meshed with the screw member 11 and the nut member 12, and the retainer ring 14 is supported with respect to these planetary gears 19, even if the nut member 12 is repeatedly reciprocally moved in the axial direction, the rotational phase of the nut member 12 and the rotational phase of the retainer ring 14 are maintained always in the constant relationship, and the displacement in both the axial direction of the retainer ring 14 is always maintained constant. Accordingly, in the process of reciprocal movement within the predetermined moving stroke of the nut member 11, by designing the rotation delay amount of the retainer ring 14 with respect to the screw member 11 so as to be preliminarily specified to prevent the ball pockets 14a of the retainer ring 14 from flying out from opposing annular space, the phenomenon in which the ball 13 flies out from the space between the screw side spiral groove 11a and the nut side spiral groove 12a can be surely prevented.

Furthermore, as the most characteristic point of the present invention, there will be pointed out the structure in which the external tooth 17 provided for the rolling element screw device is formed in the different area in the axial direction of the screw side spiral groove 11a so as not to overlap with the screw side spiral groove 11a formed to the screw member 11, and on the other hand, the internal tooth 18 is formed in the different area in the axial direction of the nut side spiral groove 12a so as not to overlap with the nut side spiral groove 12a formed to the nut member 12. Such structure can overcome both the inconveniencies encountered in the conventional technology and the technology disclosed in the cited Patent Document 1, and since the external tooth 17 and the internal tooth 18 are formed to portions giving no influence to the spiral groove receiving the load from the ball 13, there is less restriction in design at the time of providing the external tooth 17 and the internal tooth 18, and accordingly, the present invention is applicable to the various types of the rolling element screw device.

Still furthermore, the external tooth 17 and the internal tooth 18 according to the present embodiment, as in the technology disclosed in the cited Patent Document 1, it is not necessary to form them to the land portion adjacent to the spiral groove, so that the working process can be very easily done, and accordingly, the manufacturing cost can be remarkably reduced in comparison with the cost involved by the technology disclosed in the cited patent Document 1.

Figure 4:
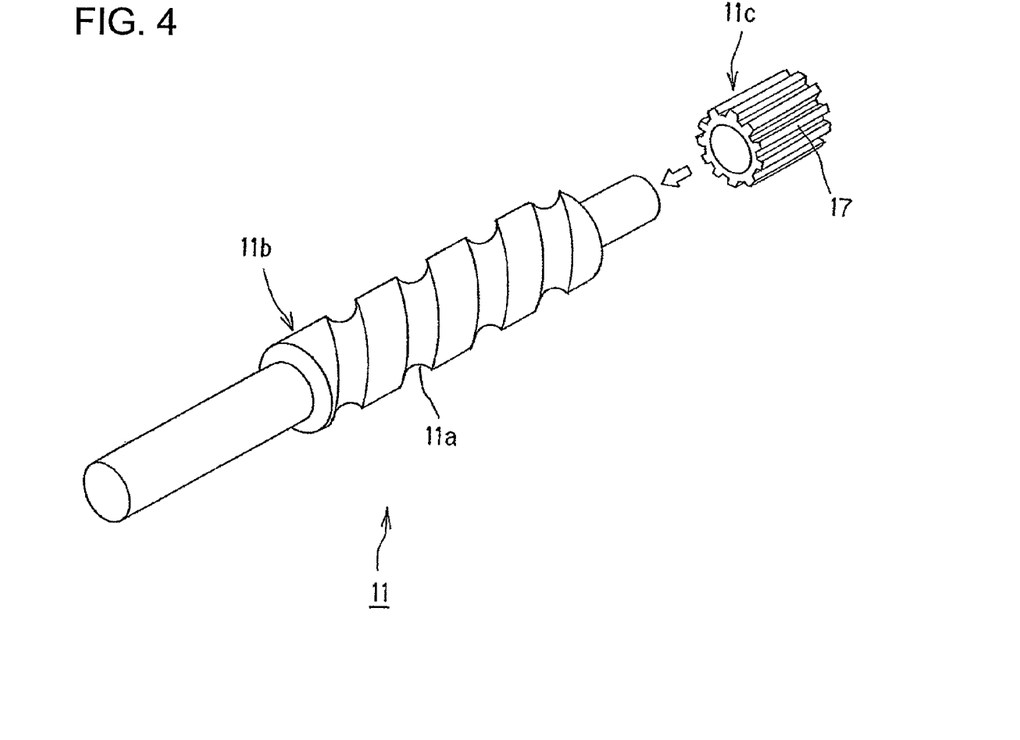
[FIG. 4] is a view showing an example of a preferred modification of a screw member according to the embodiment of the present invention.
Figure 5:
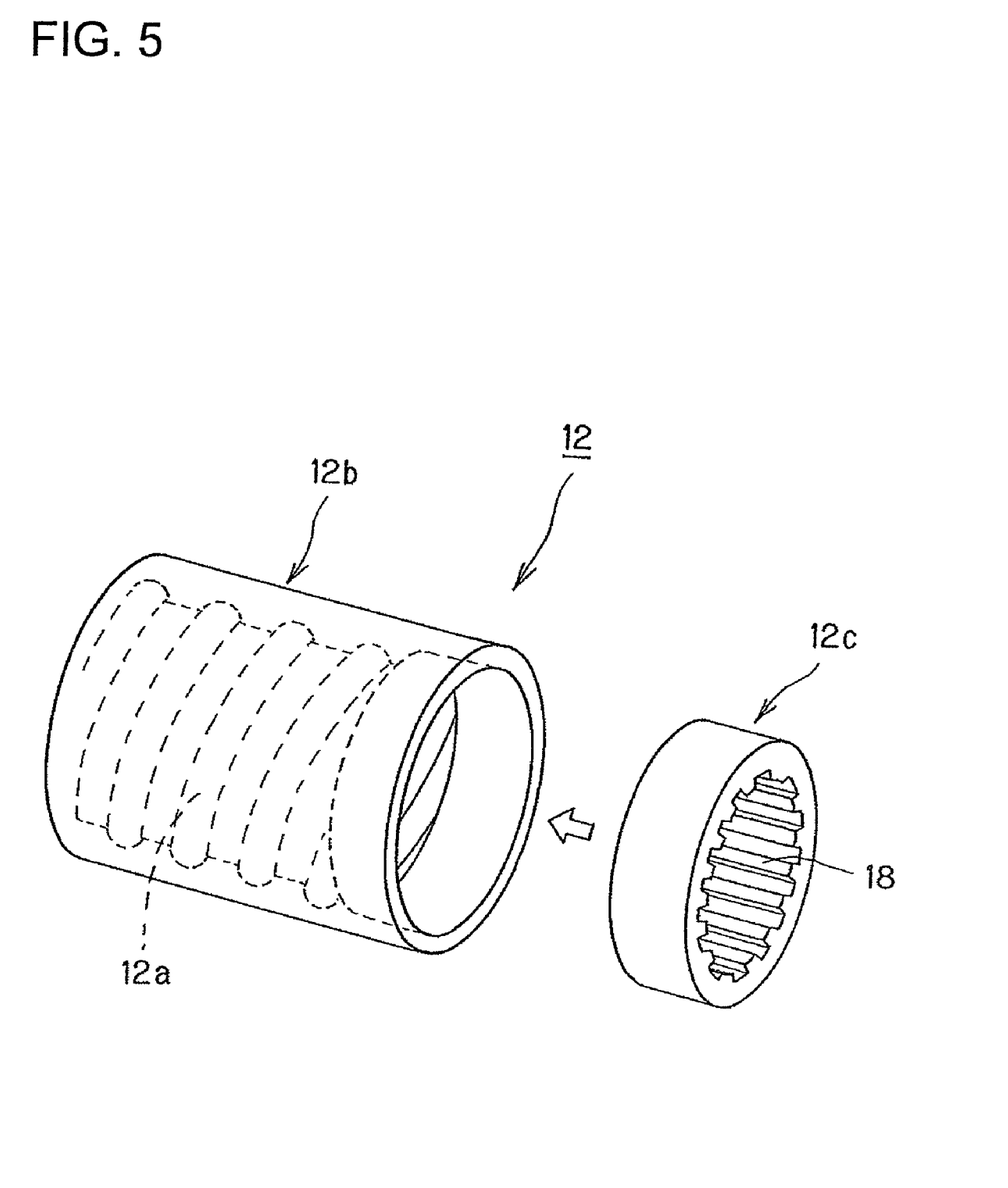
[FIG. 5] is a view showing an example of a preferred modification of a nut member according to the embodiment of the present invention.

Incidentally, in order to further reduce the manufacturing cost, it may be possible to remake the forming method of the external tooth 17 and the internal tooth 18. Such remaking method will be explained with reference to FIGS. 4 and 5. As explanatorily shown in FIG. 4, it is preferable for the screw member 11 to be formed in combination of different members such as screw member body 11b to which the screw side spiral groove 11a is formed and an external tooth forming portion 11c to which the external tooth 17 is formed, and on the other hand, as explanatorily shown in FIG. 5, it is preferable for the nut member 12 to be formed in combination of different members such as nut member body 12b to which the nut side spiral groove 12a is formed and an internal tooth forming portion 12c to which the internal tooth 18 is formed. The employment of the combination of the different members as shown in FIGS. 4 and 5 makes easy the working, thus making possible to manufacture the rolling element screw device with reduced cost. Especially, it is necessary for the nut side spiral groove 12a to be formed at the inner peripheral surface of the nut member 12 at which the working is very difficult, so that the manufacturing cost reducing effect can be advantageously achieved by separately providing the internal tooth forming portion.

Furthermore, with the rolling element screw device according to the present embodiment, by increasing or decreasing the range in which the external tooth 17 and the internal tooth 18 are formed, it becomes possible to set the stroke amount to a desired value. This is because that the structure formed such that the external tooth 17 and the internal tooth 18 are not overlapped with the screw side spiral groove 11a and the nut side spiral groove 12a, respectively, is adopted, and since the stroke amount can be set within the optional range without affecting any influence to the structure of the ball setting position applying load, this is extremely preferable.

In addition, the above advantageous point is an effective point in comparison with the technology disclosed in the Patent Document 1 which is essentially provided with the structure in which the location number of the balls must be reduced for providing the planetary gears 109, and according to the rolling element screw device of the embodiment of the present invention, it is made possible to locate the power transmission mechanism with the rigidity of the device being maintained.

Hereinabove, although the preferred embodiment of the present invention was described, the technical scope of the present invention is not limited to the range of the description of the described embodiment. It is possible for the above embodiment to be added with various changes or modifications.

For example, the rolling element screw device of the described embodiment adopts the balls 13 as a plurality of rolling elements, but it may be possible to employ other rolling elements such as rollers.

Furthermore, although it is described that, as the condition for forming the external tooth 17 and the internal tooth 18, they may be provided with the tooth numbers in conformity with the movement difference between the retainer ring 14 and the nut member 12, it may be preferred that the gear angles of the external tooth 17, the internal tooth 18 and the planetary gears 19 are formed so as to conform with the lead angles of the screw side spiral groove 17 and the nut side spiral groove 18. By employing such structure, it becomes possible to extremely suppress the sliding amounts between the external tooth 17 and the planetary gears 19 and between the internal tooth 18 and the planetary gears 19, thus realizing the rolling element screw device having the improved reliability.

Still furthermore, in the described embodiment, although three planetary gears 19 are provided, the number of the planetary gears 19 should not be limited thereto, and it may be possible for the rolling element screw device of the present invention to be provided with a plurality of planetary gears, two or more than two, for realizing the rolling element screw device of the present invention.

Still furthermore, in the described embodiment, although the example in which the retainer ring 14 is formed of resin, is shown, the retainer ring 14 may be formed of metal material. In such case, the retainer ring 14 may be produced by forming a metal plate into cylindrical shape.

It is apparent from the scope of the appended claims that such changes and modifications as mentioned above are incorporated in the technical scope of the present invention.

The invention claimed is:

1. A rolling element screw device comprising:
    a screw member formed, in an outer peripheral surface thereof, with a screw side spiral groove;
    a nut member formed, in an inner peripheral surface thereof, with a nut side spiral groove;
    a plurality of rolling elements disposed to be rollable between the screw side spiral groove and the nut side spiral groove;
    a retainer ring disposed in an annular space between the screw member and the nut member opposing to each other and adapted to retain the plurality of rolling elements at predetermined positions to be rollable; and
    a power transmission mechanism for moving, in a condition that either one of the screw member and the nut member is constructed as a rotating side member, the retainer ring in an axial direction in accordance with the lead angles of the screw side spiral groove and the nut side spiral groove while rotating the retainer ring with a constant relation being maintained with respect to a rotational phase of the rotating side member according to rotation of the rotating side member,
    the power transmission mechanism comprising:
    an external tooth formed to the screw member;
    an internal tooth formed to the nut member; and
    a plurality of planetary gears held, to be rotatable, at circumferentially predetermined positions of the retainer ring in a condition to be meshed with the external tooth and the internal tooth, respectively, wherein
    the external tooth is formed to an area separated in an axial direction of the screw side spiral groove so as not to overlap with the screw side spiral groove formed to the screw member, and
    the internal tooth is formed to an area separated in an axial direction of the nut side spiral groove so as not to overlap with the nut side spiral groove formed to the nut member.

2. The rolling element screw device according to claim 1, wherein the screw member is provided with a screw member body to which the screw side spiral groove is formed and an external tooth forming portion to which the external tooth is formed, and the nut member is provided with a nut member body to which the nut side spiral groove is formed and an internal tooth forming portion to which the internal tooth is formed.

3. The rolling element screw device according to claim 1 or 2, wherein gear angles of the external tooth, the internal tooth and the planetary gear are formed so as to correspond to the lead angles of the screw side spiral groove and the nut side spiral groove, respectively.

4. The rolling element screw device according to claim 1 or 2, wherein the planetary gear has a central axis which is positioned on a pitch circle of the plurality of rolling elements.

* * * * *